United States Patent
McGibbon et al.

(10) Patent No.: US 10,556,220 B2
(45) Date of Patent: Feb. 11, 2020

(54) MEDIA CARTRIDGE WITH ADJUSTABLE BYPASS

(71) Applicant: 3M INNOVATIVE PROPERTIES COMPANY, St. Paul, MN (US)

(72) Inventors: Donald L. McGibbon, Southington, CT (US); Laurence W. Bassett, Killingworth, CT (US)

(73) Assignee: 3M Innovative Properties Company, St. Paul, MN (US)

(*) Notice: Subject to any disclaimer, the term of this patent is extended or adjusted under 35 U.S.C. 154(b) by 302 days.

(21) Appl. No.: 14/410,251

(22) PCT Filed: Jun. 26, 2013

(86) PCT No.: PCT/US2013/047768
§ 371 (c)(1),
(2) Date: Dec. 22, 2014

(87) PCT Pub. No.: WO2014/004607
PCT Pub. Date: Jan. 3, 2014

(65) Prior Publication Data
US 2015/0321926 A1 Nov. 12, 2015

Related U.S. Application Data

(60) Provisional application No. 61/666,252, filed on Jun. 29, 2012.

(51) Int. Cl.
*B01J 20/14* (2006.01)
*C02F 1/28* (2006.01)
*C02F 1/42* (2006.01)

(52) U.S. Cl.
CPC ............... *B01J 20/14* (2013.01); *C02F 1/283* (2013.01); *C02F 1/42* (2013.01);
(Continued)

(58) Field of Classification Search
CPC ............ B01D 27/103; B01D 2313/083; C02F 2301/043; C02F 1/006; C02F 1/008
See application file for complete search history.

(56) References Cited

U.S. PATENT DOCUMENTS 4,620,929 A * 11/1986 Hofmann ............. A01K 63/045
210/610
5,167,939 A 12/1992 Lohrberg
(Continued)

FOREIGN PATENT DOCUMENTS

DE  10 2009 013375  9/2010
JP  H09-174050  7/1997

*Primary Examiner* — Ryan B Huang
(74) *Attorney, Agent, or Firm* — Scott A. Baum

(57) ABSTRACT

Provided are media cartridges that have adjustable bypasses, and systems and methods that use them. Aspects include an adjustable bypass filter cartridge where a treated stream and an adjusted non-treated stream combine prior to post-filtration and the percentage or ratio of treated the and the non-treated water is adjustable at the time of installation from the outside of the filter cartridge with a known or predictable level of bypass. Media cartridges comprise: an inlet in fluid communication with a feed chamber and an outlet in fluid communication with a mixing compartment; a media compartment containing a media; a bypass port in fluid communication with the feed chamber and the mixing compartment. Such cartridges can be adjusted to meet the needs of a wide variety of end uses.

15 Claims, 3 Drawing Sheets

(52) U.S. Cl.
CPC .. *C02F 2001/425* (2013.01); *C02F 2201/006* (2013.01); *C02F 2301/043* (2013.01); *C02F 2303/22* (2013.01)

(56) References Cited

U.S. PATENT DOCUMENTS

| | | | |
|---|---|---|---|
| 5,770,054 A | 6/1998 | Ardes | |
| 5,897,770 A | 4/1999 | Hatch | |
| 6,923,910 B2 * | 8/2005 | McGibbon | B01D 35/157 |
| | | | 210/232 |
| 2004/0129627 A1 | 7/2004 | McGibbon | |
| 2007/0227963 A1 | 10/2007 | Fick | |
| 2008/0035221 A1 * | 2/2008 | Gawryjolek | F16K 1/305 |
| | | | 137/613 |
| 2009/0173675 A1 * | 7/2009 | Scholz | B01D 35/153 |
| | | | 210/101 |
| 2010/0059424 A1 * | 3/2010 | Scholz | A47J 31/605 |
| | | | 210/101 |
| 2010/0325898 A1 | 12/2010 | Scholz | |
| 2010/0326898 A1 | 12/2010 | Scholz | |
| 2011/0005988 A1 * | 1/2011 | Bassett | B01D 27/08 |
| | | | 210/232 |
| 2011/0309024 A1 | 12/2011 | Athanasiadis | |
| 2012/0118809 A1 | 5/2012 | Bauer | |

* cited by examiner

MEDIA CARTRIDGE WITH ADJUSTABLE BYPASS

TECHNICAL FIELD

This disclosure relates to filter cartridges containing media used for filtering fluids, and particularly to filter cartridges containing media such as ion exchange resin, and an adjustable bypass. These filter cartridges are useful for water softening/scale reduction applications.

BACKGROUND

Water softening and/or scale reduction filters are used for making beverages in the restaurant and service industries. Ion exchange materials, such as weak acid cation (WAC) exchange resins, are typically used to exchange hardness minerals (calcium and magnesium) from water with hydrogen or sodium. This results in water with lower scaling potential and use of such water reduces prematurely scaling and maintenance of beverage equipment, including coffee equipment.

If the WAC exchange resin removes all of the hardness minerals, however, the ability of that water to extract coffee from the coffee-beans may be somewhat compromised, and the taste of the beverage could be adversely affected. Some residual hardness in water used to make beverages is preferred and various beverages require their own hardness specification in water.

There is a need for reduction of scaling-potential of water through use of WAC resin and an adjustable bypass feature to divert some of the water from contacting the resin that would allow the end user to dial in the hardness to a desired specification. Also, there is a need for a final polishing carbon filter to remove any residual chlorine, taste and odor from the entire amount of water (both treated by the resin and diverted through the bypass). There is a need to provide a single cartridge that can adjust the amount of untreated fluid at the time of installation from the outside of the filter cartridge with a known or predictable level of by pass and re-combine it prior to post filtration with treated fluid.

SUMMARY

Provided are media cartridges that have adjustable bypasses, and systems and methods that use them. In a first aspect, a media cartridge comprises: an inlet in fluid communication with a feed chamber and an outlet in fluid communication with a mixing compartment; a media compartment containing a media; a bypass port in fluid communication with the feed chamber and the mixing compartment; wherein a first fluid path is defined by the feed chamber and the media compartment such that fluid flowing through the first fluid path contacts the media to form a treated fluid that enters the mixing compartment; and a second fluid path is defined by the feed chamber and the bypass port such that fluid flowing through the second fluid path does not contact the media and is untreated upon entry into the mixing compartment.

In one embodiment, the mixing compartment comprises an insert therein that is in fluid communication with the media compartment and the bypass port, the insert comprising a bypass regulator that is adjustable to a desired bypass flow amount. The bypass regulator can be is adjustable by rotation of a drive. The bypass regulator can comprise a plurality of holes. An indicator can be further provided that conveys information about the desired bypass flow amount. The insert can contain a filter therein. The filter can be a carbon-containing filter block. The media can comprise one or more ion-exchange resins. In a detailed embodiment, the ion-exchange resin comprises a weak acid cation (WAC) exchange resin.

In one or more embodiments, the media cartridge further comprises a conduit connected to the mixing compartment such that treated fluid passes through the conduit before entering the mixing compartment.

In one or more embodiments, the media cartridge further comprises a feed separator (for filtering fluid entering the media compartment and the bypass port). Other embodiments provide that the media cartridge further comprises a media separator (for filtering fluid exiting the media compartment).

Another aspect provides an ion exchange resin cartridge comprising: an inlet in fluid communication with a feed chamber and an outlet in fluid communication with a mixing compartment that optionally contains a filter; a media compartment containing one or more ion-exchange resins; a bypass port in fluid communication with the feed chamber and the mixing compartment; wherein a first fluid path is defined by the feed chamber and the media compartment such that fluid flowing through the first fluid path contacts the one or more ion-exchange resins to form a treated fluid that enters the mixing compartment; and a second fluid path is defined by the feed chamber and the bypass port such that fluid flowing through the second fluid path does not contact the media is untreated upon entry into the mixing compartment. The mixing compartment can further comprises an insert therein that is in fluid communication with the media compartment and the bypass port, the insert comprising a bypass regulator that is adjustable to a desired bypass flow amount.

Another aspect is a beverage preparation system comprising: an ion exchange cartridge disclosed herein wherein the ion-exchange resin comprises a weak acid cation (WAC) exchange resin; and wherein the desired bypass flow amount is effective to provide water having a desired hardness.

Other aspects include methods of fluid treatment, the methods comprising: passing a fluid through an inlet of a media cartridge and into a feed chamber; flowing a first portion of the fluid from the feed chamber through a media compartment containing a media to form a treated fluid and flowing the treated fluid into a mixing compartment; flowing a second portion of the fluid that does not contact the media and is an untreated fluid through a bypass port into the mixing compartment; combining the treated fluid and the untreated fluid in the mixing compartment; and flowing contents of the mixing chamber through an outlet. The methods can further comprise regulating flow through the bypass port by using a bypass regulator that is adjustable to a desired bypass flow amount. In one or more embodiments, the methods further comprise filtering the contents of the mixing chamber through a filter located in the mixing chamber. In detailed embodiments, the media comprises one or more ion exchange resins. The filter can be a carbon-containing block.

These and other aspects of the invention are described in the detailed description below. In no event should the above summary be construed as a limitation on the claimed subject matter.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Figure 1:
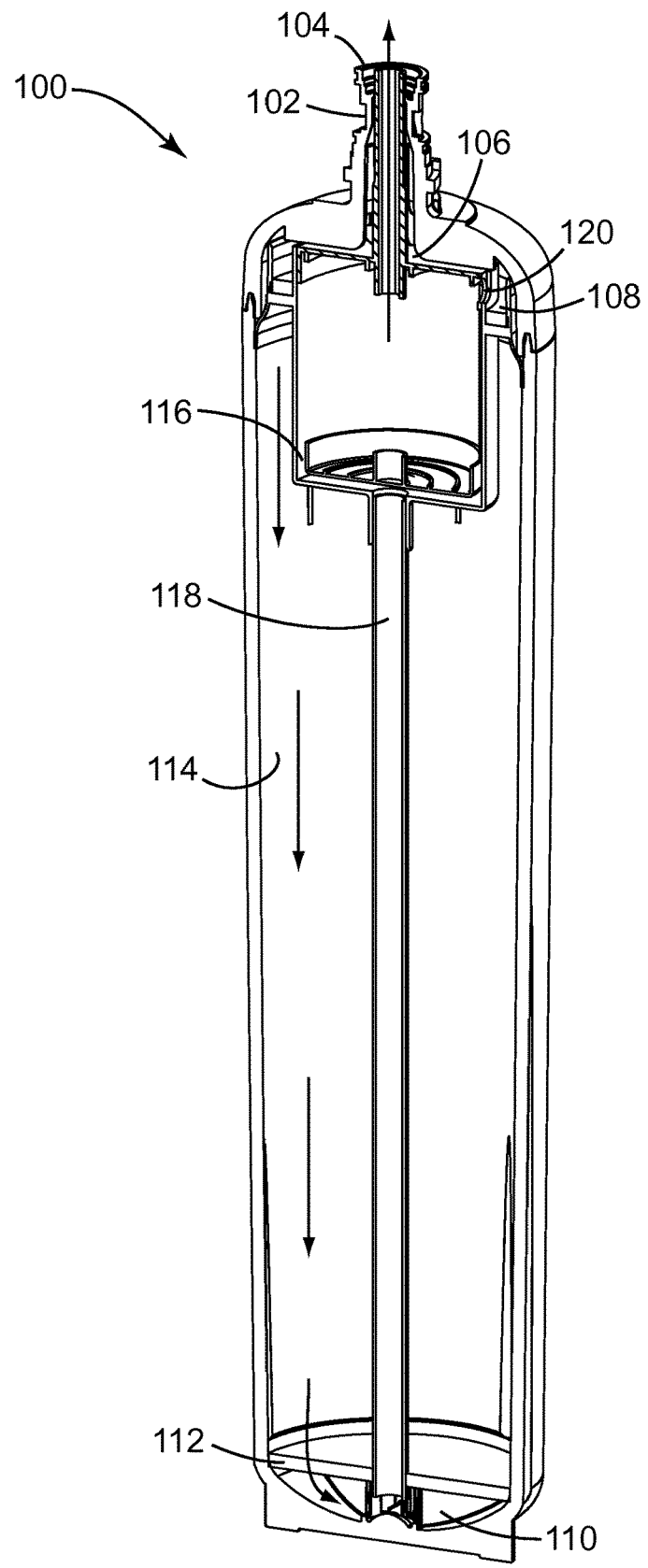
FIG. 1 is a cross-section schematic of a media cartridge with adjustable bypass.

Before describing several exemplary embodiments of the invention, it is to be understood that the invention is not limited to the details of construction or process steps set forth in the following description. The invention is capable of other embodiments and of being practiced or being carried out in various ways.

Provided are media cartridges that have adjustable bypasses, and systems and methods that use them. Aspects include an adjustable bypass filter cartridge where a treated stream and an adjusted non-treated stream combine prior to post-filtration and the percentage or ratio of treated the and the non-treated water is adjustable at the time of installation from the outside of the filter cartridge with a known or predictable level of bypass. Specifically, such cartridges allow users to adjust the portion of total fluid, specifically, water that contacts a desired treatment media, such as a weak acid cation exchange resin, while also allowing the total amount of fluid to contact a polishing filter such as a carbon-based filter. Use of an adjustable bypass in a single cartridge while also offering a compartment for polishing allows media cartridges to be provided in an efficient manner. That is, one cartridge can be adjusted to meet the needs of a wide variety of end uses. Cartridges disclosed herein allow an end user to dial in the hardness to the desired specification while also removing any residual chlorine, taste and odor from all of the water.

The following terms shall have, for the purposes of this application, the respective meanings set forth below.

"Fluid path" refers to the substantially continuous route of a fluid through the cartridge.

"Treated fluid" refers to fluid that has contacted a media to achieve a desired treatment. For example, fluid treated by a weak acid cation (WAC) exchange resin achieves a reduction in hardness.

"Untreated fluid" fluid that bypasses treatment by a media. Both treated and untreated fluid can be purified as needed by a filter such as a carbon-based filter.

The terms "media" and "adsorptive media" include materials (called adsorbents) having an ability to adsorb particles via different adsorptive mechanisms. These media can be in the form of, for example, spherical pellets, rods, fibers, molded particles, or monoliths with hydrodynamic diameter between about 0.01 to 10 mm. If such media is porous, this attribute results in a higher exposed surface area and higher adsorptive capacity. The adsorbents may have combination of micropore and macropore structure enabling rapid transport of the particles and low flow resistance.

"Ion exchange resin" refers to an insoluble matrix (or support structure) normally in the form of small beads fabricated from an organic polymer substrate. The material has a structure of pores on the surface that, upon chemical activation, can comprise exchange sites that trap and release ions.

"Microreticular," used herein to describe ion exchange resins, refers to ion exchange resins having no permanent pore structure. For example, a microreticular may comprise a cross-linked polymer gel having polymeric chains, wherein a pore structure is defined by varying distances between the polymeric chains. Such gels, whose pore structure is subject to variation based on a number of factors, are commonly referred to as gel-type resins.

"Macroreticular," used herein to describe ion exchange resins, refers to ion exchange resins comprising one or more agglomerates of microreticulars. Openings or apertures defined between the agglomerates can give macroreticulars an additional porosity beyond that of their constituent microreticulars.

The media cartridges may include one or more types of media, including, but not limited to, ion exchange resins, activated carbon, diatomaceous earth, and the like. As to ion exchange resins, the embodiments herein are not limited to the use of any specific ion exchange resin or to any specific combinations of resins. Suitable media for inclusion in an embodiment of the invention can be selected based, at least in part, on the requirements of an intended filtration application. Ion exchange resins suitable for inclusion in the various embodiments of the invention include cationic resin, anionic resin, mixtures of cationic and anionic resins, chelating, or biologically related ion exchange resins. The ion exchange resins can be, for example, microreticular or macroreticular. In some embodiments, the microreticular type is preferred.

Ion exchange resins that may be included in embodiments of the invention include, but are not limited to, those made of cross-linked polyvinylpyrolidone and polystyrene, and those having ion exchange functional groups such as, but not limited to, halogen ions, sulfonic acid, carboxylic acid, iminodiacetic acid, and tertiary and quaternary amines.

Suitable cation exchange resins may include sulfonated phenolformaldehyde condensates, sulfonated phenol-benzaldehyde condensates, sulfonated styrene-divinyl benzene copolymers, sulfonated methacrylic acid-divinyl benzene copolymers, and other types of sulfonic or carboxylic acid group-containing polymers. It should be noted that cation exchange resins are typically supplied with H+ counter ions, NH4+ counter ions or alkali metal, e.g., K+ and Na+ counter ions. Cation exchange resin utilized herein may possess hydrogen counter ions. An exemplary particulate cation exchange resin is MICROLITE PrCH available from PUROLITE (Bala Cynwyd, Pa.), which is a sulfonated styrenedivinyl benzene copolymer having a H+ counter ion.

Other specific examples of cationic ion exchange resins include, but are not limited to, those available under the following trade designations: AMBERJET™ I200(H); AMBERLITE® CG-50, IR-I20(plus), IR-I20 (Plus) sodium form, IRC-50, IRC-50S, IRC-76, IRC-7I8, IRN-77 and IR-I20; AMBERLYST® 15, 15(wet), 15 (dry), 36(wet); and DOWEX® 50WX2-100, 50WX2-200, 50WX2-400, 50WX4-50, 50WX4-100, 50WX4-200, 50WX4-200R, 50WX4-400, HCR-W2, 50WX8-100, 50WX8200, 50WX8-400, 650C, MARATHON® C, DR-2030, HCR-S, MSC-1, 88, CCR-3, MR3, MR-3C, and RETARDION®; PUROFINE PFC100H, PUROLITE NRW100, NRW1000, NRW1100, C100, C145 and MICROLITE PrCH.

Suitable anion exchange resins may include those resins having a hydroxide counter ion whereby hydroxide is introduced during the exchange process. In some embodiments, anion exchange resin comprise quaternary ammomium hydroxide exchange groups chemically bound thereto, e.g., styrene-divinyl benzene copolymers substituted with tetramethylammoniumhydroxide. In one embodiment, the anion exchange resin comprises crosslinked polystyrene substituted with quaternary ammonium hydroxide such as the ion exchange resins sold under the trade names AMBERLYST® A-26-0H by ROHM AND HAAS Company and DOW G51-0H by DOW CHEMICAL COMPANY.

Other specific examples of anionic ion exchange resins include, but are not limited to: AMBERJET® 4200(CI); AMBERLITE® IRA-67, IRA-400, IRA-400(CI), IRA-410, IRA-900, IRN-78, IRN-748, IRP-64, IRP-69, XAD-4, XAD-7, and XAD-16; AMBERLYST A-21 and A-26 OH; AMBERSORB® 348F, 563, 572 and 575; DOWEX® 1X2-100, 1X2-200, 1X2-400, 1X4-50, 1X4-100, 1X4-200, 1X4-400, 1X8-50, 1X8-100, 1X8-200, 1X8-400, 21K CI, 2X8-100, 2X8-200, 2X8-400, 22 CI, MARATHON® A, MARATHON® A2, MSA-1, MSA-2, 550A, MARATHON® WBA, and MARATHON® WGR-2; and MERRIFIELD'S peptide resins; PUROLITE A200, A500, A845, NRW400, NRW4000, NRW6000 and MICROLITE PrAOH. A specific example of mixed cationic and anionic resins is AMBERLITE® MB-3A; PUROFINE PFA600, PUROLITE MB400, MB600, NRW37, NRW3240, NRW3260 and NRW3460.

Suitable chelating exchange resins for removing heavy metal ions may comprise polyamines on polystyrene, polyacrylic acid and polyethyleneimine backbones, thiourea on polystryrene backbones, guanidine on polystyrene backbones, dithiocarbamate on a polyethyleneimine backbone, hydroxamic acid on a polyacrylate backbone, mercapto on polystyrene backbones, and cyclic polyamines on polyaddition and polycondensation resins.

Other specific examples of chelating ion exchange resins include, but are not limited to: PUROLITE S108, S910, S930Plus and S950; AMBERLITE IRA-743 and IRC-748.

Specific examples of biologically related resins that can be used in the processes and products of the invention include, but are not limited to, SEPHADEX® CM C-25, CM C-50, DEAE A-25, DEAEA-50, QAEA-25, QAEA-50, SP C-25, and SP C-50.

The foregoing cationic, anionic, mixed cationic and anionic, and biologically related ion exchange resins are commercially available from, for example, SIGMA-ALDRICH CHEMICAL CO., Milwaukee, Wis., or from ROHM AND HAAS, Riverside, N.J., or from PUROLITE, Bala Cynwyd, Pa.

Additional examples of ion exchange resins include, but are not limited to AG50W-X12, BIO-REX® 70, and CHELEX® 100, all of which are trade names of BIORAD, Hercules, Calif.

Figure 4:
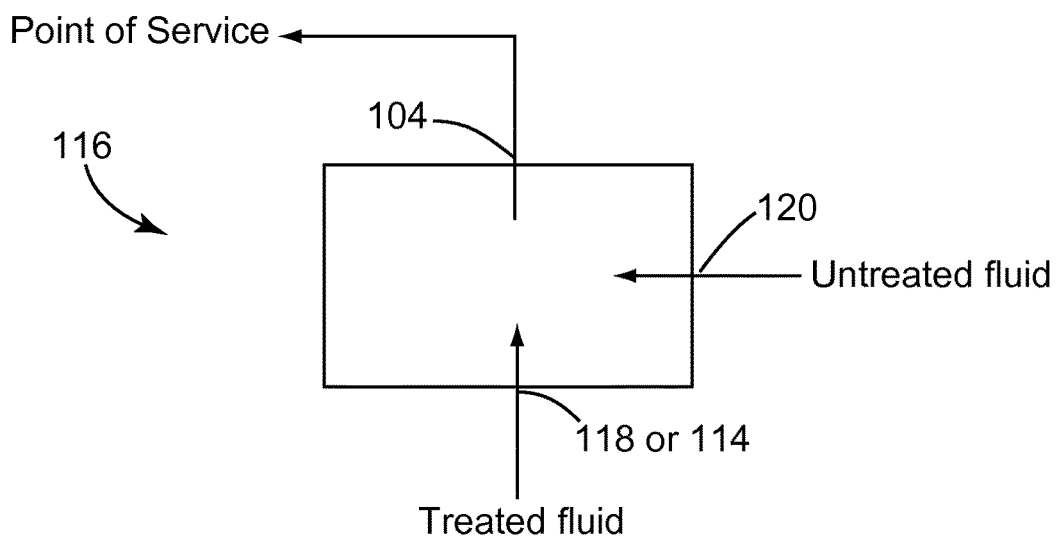
FIG. 4 depicts flow into and out of a mixing compartment.

Turning to the figures, FIG. 1 is a cross-section schematic of a media cartridge with adjustable bypass, where fluid, such as water, enters the cartridge 100 through inlet 102 and into feed chamber 106. The feed then passes through a feed separator 108 (optional), which aids in keeping the media from escaping the cartridge. From the feed separator 108, the fluid flows either into the media compartment 114 following the path shown by the arrows or through the bypass port 120 into the mixing compartment 116. The amount of fluid going into the mixing compartment 116 is related to the size of bypass port 120. The media compartment 114 contains a desired media (not depicted) for treating the fluid. A first fluid path is one where fluid contacts the media in the media compartment to form a treated fluid which then enters the mixing compartment 116. A second fluid path is one where fluid does not contact the media, leaving this fluid untreated, and this fluid flows from the feed chamber and into the mixing compartment directly. Treated fluid flows through media separator 112 (optional), which aids in keeping the media from escaping the cartridge, and into the treated chamber 110. Treated fluid then flows through conduit 118 and into the mixing compartment 116. In some embodiments, the treated fluid can flow from the media compartment 114 and into the mixing compartment 116 without the need for a media separator 112, a treated chamber 110, or a conduit 118. As shown in FIG. 4, treated and untreated fluids mix in the mixing compartment 116 to form an outlet fluid which flows through outlet 104 and to a point of use or service.

The body of the cartridge typically comprises a top cover and a sump. For some products, these pieces can be formed integrally or be permanently sealed together during manufacturing to form a sealed cartridge/body. As desired, however, these pieces can be separable and even reusable.

Figures 2A, 2B:
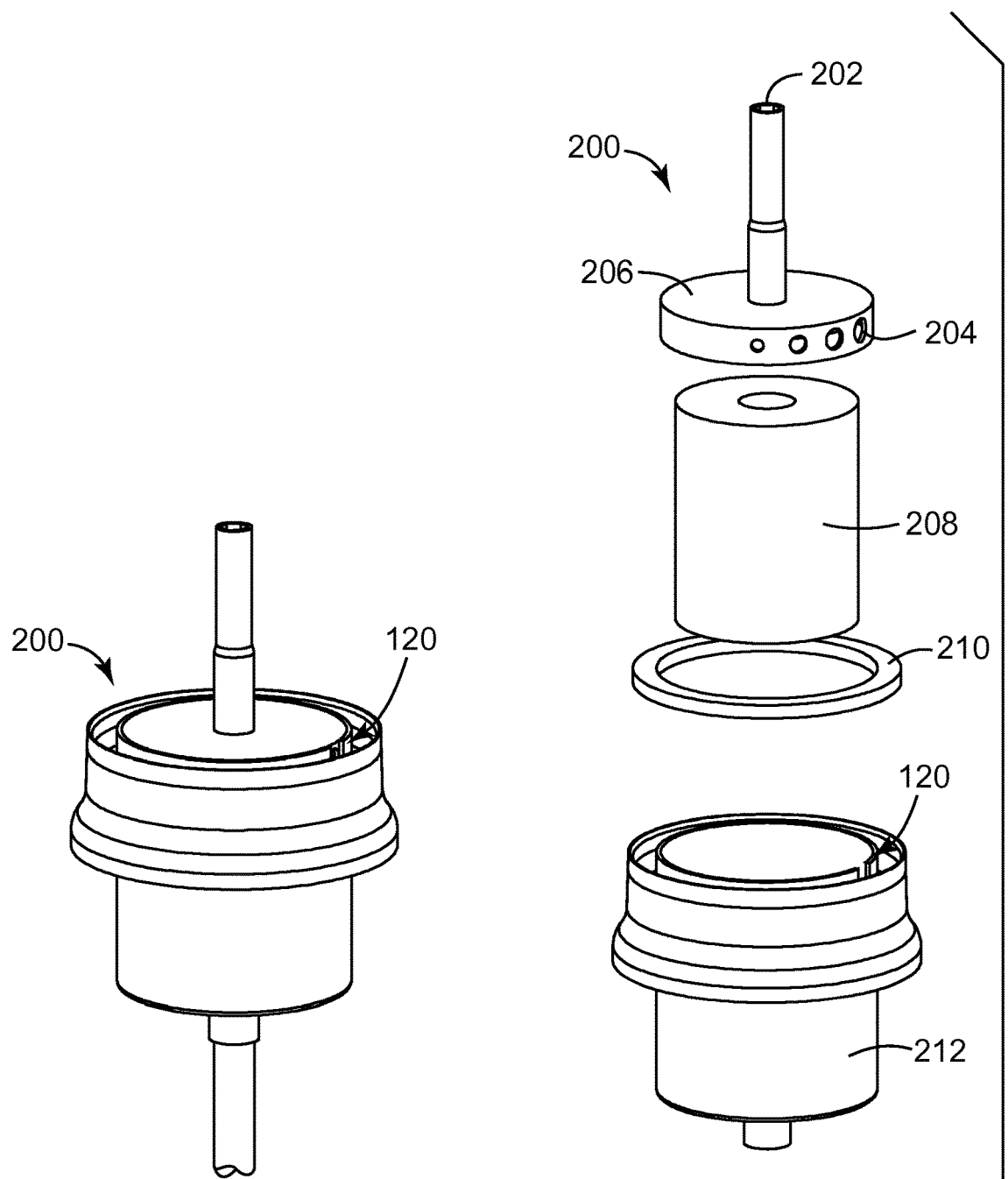
FIGS. 2A and 2B provide a schematic of an insert for the media cartridge according to an embodiment.

In one embodiment, no kind of purification is provided in the mixing compartment 116. In other embodiments, the mixing compartment 116 contains a filter or other device or media for purifying the fluid. FIGS. 2A and 2B provide a schematic of an insert that can holding a filter or other purification device and that can provide regulation of the bypass port 120. The filter can be a composite block of activated carbon and a binder such as ultra high molecular weight polyethylene. The insert 200 contains a bypass regulator 204, which can contain one or more openings or structures of varying sizes and configurations to vary the flow passing through the bypass port 120 in a known or predictable way. For example, any percentage of fluid (for example, 1 vol. %, 2.5 vol. %, 5 vol. %, 10 vol. %, 20 vol. %, 30 vol. %, 40 vol. %, or even 50 vol. % or more) can bypass treatment by the media. Drive 202, which offers adjustment external to the cartridge, is used to move bypass regulator 204 to a desired location to achieve a desired flow. The drive can be any desired shape or configuration. For example, a hex drive or other unique-shaped drive with directional orientation can be used. Integral or affixed to the drive unit is the bypass regulator 204. In one embodiment, a series of holes are provided, that are sized to bypass desired percentages. For example, there could be a series of discreet holes corresponding to a percentage (10 vol. % or 20 vol. %, or the like) or there could be or a fan or wedge shape that could return a continuum of analog percentages such as 10% 11% 12% and the like. By inserting a drive handle and turning the upper end cap 206 relative to the block cover 212, the bypass percent is adjustable from outside the cartridge. Having marker on the outside of the cartridge either by molding it into the plastic or by the application of a label, the drive handle could then be aligned to the desired bypass as recommended by a coffee machine manufacturer in view of the quality of incoming water.

A purification device, such as a carbon-containing block 208 can be contained within the block cover 212 and the upper end cap 206. The insert 200 is in fluid communication with the conduit 118. A spacer 210 is optional to orient the carbon-containing block as desired.

Figure 3:
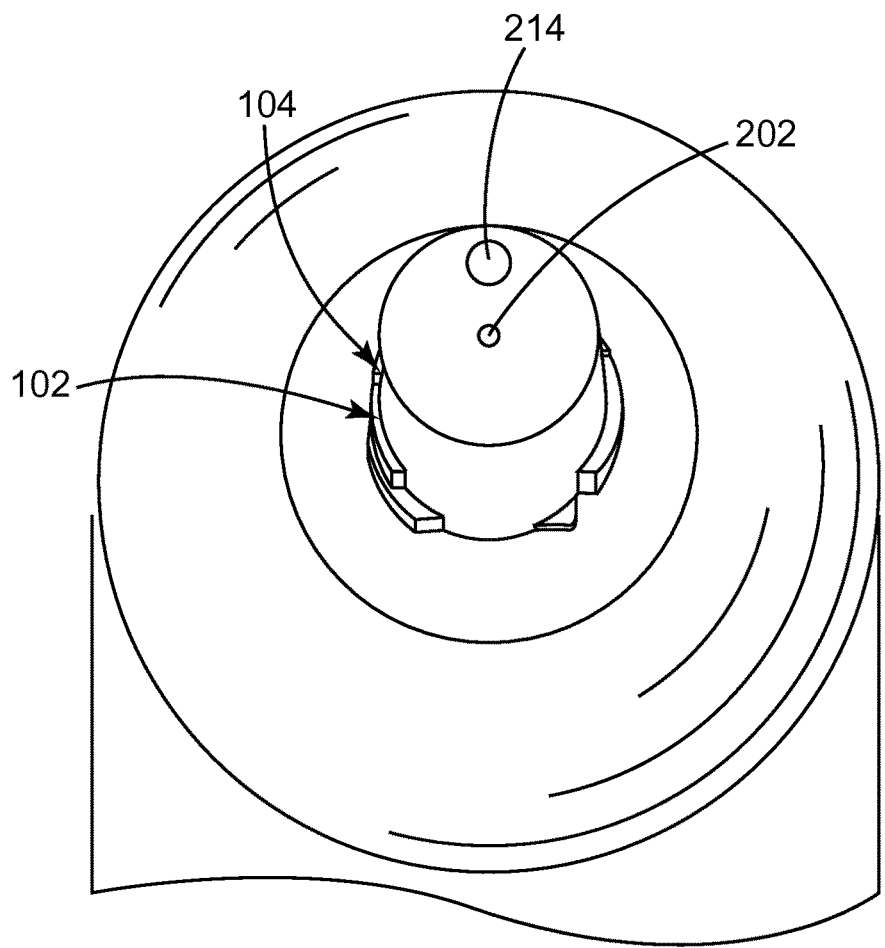
FIG. 3 is a top view of an embodiment of the media cartridge.

In FIG. 3, a specific embodiment is shown with an indicator 214 that can be provided to aid in utilizing the drive 202 to adjust to a location of the bypass regulator 204 to achieve a desired flow through the bypass port 120.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements.

EXAMPLES

Example 1

A weak acid cation ion exchange resin is put into a media cartridge. A carbon block/ultra high molecular weight polyethylene (UHMWPE) composite is put into an insert which is then located in a mixing compartment of the media cartridge. The bypass regulator is set to a desired percent bypass based on the quality of the incoming water and the end user's requirements for hardness. The media cartridge is installed into a beverage system.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A media cartridge comprising:
   an inlet passing a fluid from the inlet to a feed chamber;
   a feed separator;
   a media compartment containing a media;
   a tubular conduit connected to a mixing compartment and extending into the media compartment;
   an adjustable bypass port in fluid communication with the feed chamber and the mixing compartment; the adjustable bypass port passing a fixed volume percent of the fluid between 1 vol % to 50 vol %;
   a first fluid path from the feed chamber through the feed separator and into the media compartment such that the fluid flowing through the first fluid path contacts the media to form a treated fluid that then flows through the tubular conduit into the mixing compartment; and a second fluid path from the feed chamber through the adjustable bypass port into the mixing compartment such that the fluid flowing through the second fluid path does not contact the media and is an untreated fluid upon entry into the mixing compartment; and
   wherein the treated fluid and the untreated fluid mix in the mixing compartment to form an outlet fluid which flows through an outlet.

2. The media cartridge of claim 1, wherein the mixing compartment comprises an insert having a compartment for a filter therein that is in fluid communication with the media compartment and the adjustable bypass port, the insert comprising a bypass regulator for the adjustable bypass port that is adjustable to the fixed volume percent of the fluid between 1 vol % to 50 vol %.

3. The media cartridge of claim 2, wherein the bypass regulator is adjustable by rotation of a drive.

4. The media cartridge of claim 2, wherein the bypass regulator comprises a plurality of holes.

5. The media cartridge of claim 2 wherein the insert comprises a block cover and an upper end cap.

6. The media cartridge of claim 2 further comprising an indicator that conveys information about the fixed volume percent of the fluid between 1 vol % to 50 vol %.

7. The media cartridge of claim 2, wherein the insert contains an insert filter therein.

8. The media cartridge of claim 7, wherein the insert filter is a carbon-containing filter block.

9. The media cartridge of claim 7, wherein the media comprises one or more ion-exchange resins.

10. The media cartridge of claim 9, wherein the one or more ion-exchange resins comprises a weak acid cation (WAC) exchange resin.

11. The media cartridge of claim 1 further comprising a media separator separating the media compartment from a treated chamber, and the tubular conduit extends from the treated chamber to the mixing compartment.

12. The media cartridge of claim 4 wherein the plurality of holes comprise a series of holes of increasing diameters that are sized to bypass fixed volume percentages.

13. An ion-exchange resin cartridge comprising:
   an inlet passing a fluid from the inlet to a feed chamber;
   a feed separator;
   a media compartment containing one or more ion-exchange resins;
   a tubular conduit connected to a mixing compartment and extending into the media compartment;
   an adjustable bypass port in fluid communication with the feed chamber and the mixing compartment; the adjustable bypass port passing a fixed volume percent of the fluid between 1 vol % to 50 vol %;
   a first fluid path from the feed chamber through the feed separator and into the media compartment such that the fluid flowing through the first fluid path contacts the one or more ion-exchange resins to form a treated fluid that then flows through the tubular conduit into the mixing compartment; and a second fluid path from the feed chamber through the adjustable bypass port into the mixing compartment such that the fluid flowing through the second fluid path does not contact the media and is an untreated fluid upon entry into the mixing compartment; and
   wherein the treated fluid and the untreated fluid mix in the mixing compartment to form an outlet fluid which flows through an outlet.

14. The ion-exchange resin cartridge of claim 13, wherein the mixing compartment comprises an insert that is in fluid communication with the media compartment and the adjustable bypass port; the insert comprising a block cover, an upper end cap, a carbon block filter, and a bypass regulator for the adjustable bypass port that is adjustable to the fixed volume percent of the fluid between 1 vol % to 50 vol %.

15. A beverage preparation system comprising:
the ion-exchange resin cartridge of claim 13 wherein the one or more ion-exchange resins comprises a weak acid cation (WAC) exchange resin; and
wherein the desired bypass flow amount is effective to provide water having a desired hardness.

\* \* \* \* \*